Figure 1:
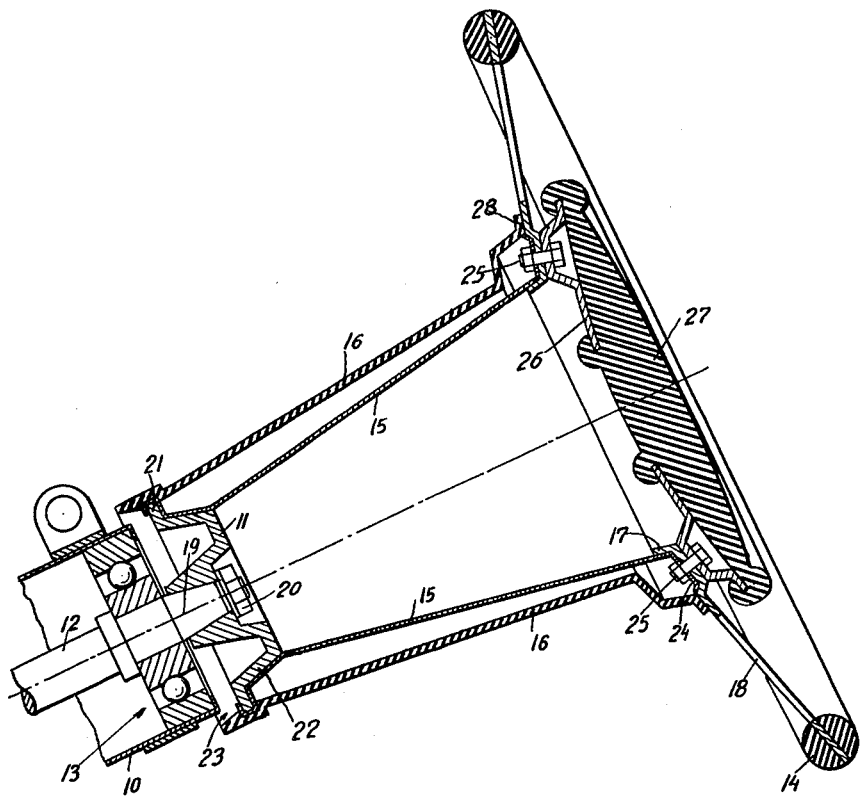

Feb. 2, 1965  K. WILFERT  3,167,974
STEERING WHEEL
Filed Nov. 8, 1961  2 Sheets-Sheet 1

Inventor
KARL WILFERT
BY Dicke and Craig
ATTORNEYS

Feb. 2, 1965 K. WILFERT 3,167,974
STEERING WHEEL

Filed Nov. 8, 1961 2 Sheets-Sheet 2

Inventor
KARL WILFERT
BY Dicke and Craig
ATTORNEYS 3,167,974
STEERING WHEEL
Karl Wilfert, Stuttgart-Degerloch, Germany, assignor to Daimler-Benz Aktiengesellschaft, Stuttgart-Unterturkheim, Germany
Filed Nov. 8, 1961, Ser. No. 151,079
Claims priority, application Germany, Nov. 11, 1960, D 34,707
4 Claims. (Cl. 74—552)

My invention relates to a safety steering wheel and it is the object of my invention to so construct such wheel as to minimize the risk of injury to a driver in event of a collision which causes the driver to be thrown upon the rim of the steering wheel. It is known that the driver of a motor vehicle may suffer very serious injuries in event of such accidents in the absence of special provisions. While it has been proposed to provide a remedy by mounting a cushion on the hub of the steering wheel, the degree by which a cushion may be deformed by the body of the driver is much too low to prevent serious injuries.

It is a further object of my invention to provide a safety steering wheel which while capable of transferring a high torque from its rim to its hub member, yet permits the rim of the steering wheel in event of a collision with the driver's body to easily yield in axial direction to an extent sufficient to minimize the risk of injuries. It is a further object of my invention to provide a safety steering wheel which while attaining this object is simple in design and lends itself to manufacture at low cost.

With the afore-said objects in view, my invention consists in the novel combinations and arrangements of parts hereinafter described with reference to some preferred embodiments illustrated in the accompanying drawings.

I wish it to be understood, however, that my invention is in no way restricted to such embodiments but is capable of numerous modifications within the scope of the appended claims and that the terms and phrases used in such detailed description have been chosen for the purpose of explaining rather than that of restricting or limiting my invention.

In the drawings.

Figure 2:
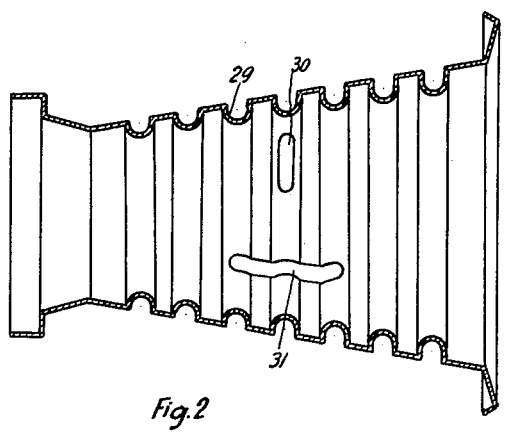
Figure 3:
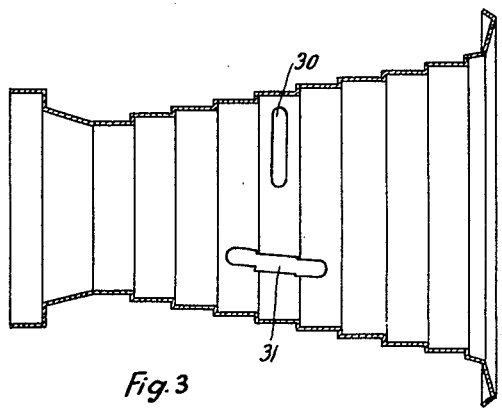

FIG. 1 is an axial section taken through my novel safety steering wheel in which an axially compressible spacer means is formed by a smooth conical sheet metal sleeve and FIGS. 2 and 3 are axial sections taken through modified spacer sleeves which can be substituted for that shown in FIG. 1.

The steering wheel illustrated in FIG. 1 comprises a support 10 formed by a conventional steering column, a hub member 11, means such as a shaft 12 and an antifriction bearing 13 for rotatably mounting the hub member 11 on the support 10, a rim 14 to be gripped by the driver of the vehicle, such rim being disposed in coaxial relationship to and axially spaced from the hub member 11, and spacer means 16, 15 which are rigidly connected with the rim 14 and with the hub member 11 and form a body of revolution which is disposed coaxially with respect to the hub member 11 and the rim 14. This spacer means is so shaped and dimensioned and consists of a material so chosen as to offer relatively low resistance to compression in axial direction. Thereby, the risk of injury to the driver in event of a collision causing the driver to be thrown on the rim 14 is minimized.

In the embodiment illustrated in FIG. 1 the spacer means comprises an inner sheet metal sleeve 15 and an outer plastic sleeve 16 both disposed in coaxial nested relationship and both connected with the rim 14 and with the hub member 11. Suitable connecting means are provided for connecting the spacer means rigidly with the rim 14. In the embodiment shown this connecting means includes an annular member 17 which is coaxially fixed to the rim 14, for instance by spokes 18 which are integral with the annular member 17 and have their ends embedded in the rim 14 which consists of a suitable plastic in the conventional manner. The annular member 17 is mounted in engagement with the spacer means 15, 16.

In the embodiment illustrated in FIG. 1 the sheet metal sleeve 15 has a conical shape tapering in the direction from the end adjacent to the rim 14 towards the end fixed to the hub member 11. The hub member 11 which is suitably fixed to the conical end portion 19 of the shaft 12 by a nut 20 has an outer flange portion 21 and an adjoining conical portion 22. The inner end of the sheet metal sleeve 15 is shaped complementary to the portions 21 and 22 so as to be seated thereon in intimate contact and has a marginal portion folded around the flange 21 as shown at 23. In this manner, a rigid and reliable connection is ensured between the sleeve member 15 and the hub member 11 enabling the sleeve member 15 to transfer a high torque from the rim 14 to the hub member 11.

The spacer sleeve 15 is preferably formed with an outer flange 24 which engages the annular member 17 and is detachably fixed thereto by a plurality of circumferentially distributed threaded bolts 25.

The same bolts serve the purpose of fixing an annular plate 26 to the annular member 17, such plate carrying a cushion 27 on its outside so as to close the outer end of the conical sleeve 15. The cushion 27 is detachably connected with the plate 26. Upon removal of the cushion access may be had to the threaded bolts 25. Moreover, a suitable wrench may be introduced through the central opening of plate 26 for operation of the nut 20.

The lower end portion of the outer sleeve 16 consisting of a suitable plastic is provided with an internal groove into which the flange 21 surrounded by the folded sheet metal is resiliently sprung, whereas the upper end of the plastic sleeve 16 has a flange 28 engaging the annular member 17.

The spacer means 15, 16, while offering a relatively low resistance to any axial forces, are capable of transferring a considerable torque from the rim 14 to the hub member 11. Should it happen in event of a collision that the driver is thrown upon the rim 14 and the cushion 27, the outer sleeve 16 will be readily resiliently disengaged from the hub member 11 and will easily break, whereas the internal sheet metal sleeve 15 will be axially compressed offering but a relatively low resistance to such axial compression owing to its conical shape and its limited thickness. Owing to this compression, the rim 14 is not liable to afflict serious injuries upon the driver.

Owing to the considerable axial distance between the hub member 11 and the plate 26 which is of the same order as the length of the radius of the rim 14, this rim may travel through a considerable distance before stopped by engagement of the plate 26 with the hub 11 and during this travel the sheet metal sleeve 15 in the act of being folded together will be operative to smoothly stop the driver's body with a minimum of retardation forces. Any injury which the driver would suffer by the annular member 17 and the plate 26 is minimized by the cushion 27 having a large surface.

The embodiment illustrated in FIG. 1 is capable of numerous modifications. Thus, the smooth conical sheet metal sleeve 15 may be replaced with a sheet metal sleeve having peripheral corrugations 29 as shown in FIG. 2. The corrugated sheet metal sleeve will be more easily folded in axial direction similar to a bellows, since the corrugations 21 facilitate the initiation of the deformation. The forces required for the axial compression of the corrugated sleeve will increase steadily from the left towards the right, thus gradually increasing the resistance offered by the corrugated sleeve against the axial compression.

Alternatively, a sheet metal sleeve tapering stepwise from the rim towards the hub member as shown in FIG. 3 may be substituted for the smooth sheet metal sleeve 15 in FIG. 1. Moreover, the spacer means may be weakened by suitable apertures, such as transverse slots 30 or longitudinal slots 31 shown in FIGS. 2 and 3 which will further reduce the resistance offered by the sheet metal sleeve to longitudinal compression. Such apertures will not substantially reduce the torsional strength of the sheet metal member and, therefore, will not jeopardize the reliability of the steering operation.

The advantages of the invention as here outlined are best realized when all of its features and instrumentalities are combined in one and the same structure, but useful devices may be produced embodying less than the whole.

From the foregoing it will be seen that this invention is one well adapted to attain all of the ends and objects hereinabove set forth, together with other advantages which are obvious and which are inherent to the combination.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A safety steering wheel comprising a support, a hub member, means for rotatably mounting said hub member on said support, a steering wheel rim disposed in coaxial relationship to and axially spaced from said hub member, a spacer sleeve rigidly connected at one end thereof with said rim and at the other end thereof with said hub member, said spacer sleeve having a hollow, annular configuration with the diameter thereof decreasing continuously towards the end secured to said hub member, said spacer sleeve being constructed to enable axial deformation at relatively low compressive loads, said spacer sleeve at the end secured to said hub member having marginal portions folded around the periphery of said hub member, said spacer sleeve at the end adjacent said rim having a flange portion, an annular member secured to said rim and overlying said flange portion, an essentially annular centrally apertured plate having portions overlying said annular member, readily detachable means connecting said flange portion, said annular member and said essentially annular plate to each other, and resilient cushion means supported upon said plate member.

2. A safety steering wheel comprising a support, a hub member, means for rotatably mounting said hub member on said support, a steering wheel rim disposed in coaxial relationship to and axially spaced from said hub member, a spacer sleeve rigidly connected at one end thereof with said rim and at the other end thereof with said hub member, said spacer sleeve having a hollow, annular configuration with the diameter thereof decreasing continuously towards the end secured to said hub member, said spacer sleeve being constructed to enable axial deformation at relatively low compressive loads, said spacer sleeve at the end secured to said hub member having marginal portions folded around the periphery of said hub member, said spacer sleeve at the end adjacent said rim having a flange portion, an annular member secured to said rim and overlying said flange portion, an essentially annular centrally apertured plate having portions overlying said annular member, readily detachable means connecting said flange portion, said annular member and said essentially annular plate to each other, resilient cushion means supported upon said plate member, and an outer spacer sleeve spaced outwardly from said first-mentioned spacer sleeve and having an essentially complementary configuration.

3. A safety steering wheel comprising a support, a hub member, means for rotatably mounting said hub member on said support, a steering wheel rim disposed in coaxial relationship to and axially spaced from said hub member, a spacer sleeve rigidly connected at one end thereof with said rim and at the other end thereof with said hub member, said spacer sleeve having a configuration generally tapering from the end adjacent said rim to the end adjacent said hub member, said spacer sleeve being constructed to enable axial deformation at relatively low compressive loads, said spacer sleeve at the end secured to said hub member having marginal portions folded around the periphery of said hub member, said spacer sleeve at the end adjacent said rim having a flange portion, an annular member secured to said rim and overlying said flange portion, an essentially annular centrally apertured plate having portions overlying said annular member, readily detachable means connecting said flange portion, said annular member and said essentially annular plate to each other, and resilient cushion means supported upon said plate member.

4. A steering wheel as defined in claim 3, wherein said spacer sleeve is provided with apertures to reduce the resistance offered by said spacer sleeve to axial compressive forces.

References Cited in the file of this patent

UNITED STATES PATENTS

| | | |
|---|---|---|
| 1,502,540 | Beck | July 22, 1924 |
| 2,563,339 | Kellogg | Aug. 7, 1951 |
| 2,768,919 | Bjorksten et al. | Oct. 30, 1956 |
| 3,016,764 | Fredericks et al. | Jan. 16, 1962 |

FOREIGN PATENTS

| | | |
|---|---|---|
| 341,185 | Great Britain | Jan. 15, 1931 |
| 967,907 | France | Apr. 5, 1960 |
| 934,126 | Great Britain | Aug. 14, 1963 |